US006687372B1

(12) United States Patent
Trump et al.

(10) Patent No.: US 6,687,372 B1
(45) Date of Patent: Feb. 3, 2004

(54) PURE DELAY ESTIMATION

(75) Inventors: Tönu Trump, Bandhagen (SE); Dan Lusk, Spånga (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/568,526

(22) Filed: May 9, 2000

(30) Foreign Application Priority Data

May 10, 1999 (SE) .............................. 9901692

(51) Int. Cl.[7] .............................................. H04M 9/08
(52) U.S. Cl. ............................ 379/406.01; 379/406.06; 379/406.08; 370/286
(58) Field of Search ............... 379/406.01, 406.02, 379/406.05, 406.03, 406.08, 406.12, 406.06, 402, 403, 404, 390.04, 391, 392, 392.01; 370/286, 288, 289, 290; 455/570

(56) References Cited

U.S. PATENT DOCUMENTS

| 4,587,382 A | * | 5/1986 | Yang ............................ 379/406 |
| 4,736,414 A | | 4/1988 | Montagna et al. ........... 379/411 |
| 4,764,955 A | | 8/1988 | Galand et al. ............... 379/411 |
| 4,823,382 A | | 4/1989 | Martinez ...................... 379/411 |
| 5,414,766 A | * | 5/1995 | Cannalire et al. ............ 379/410 |
| 5,418,849 A | * | 5/1995 | Cannalire et al. ............ 379/410 |
| 5,675,644 A | | 10/1997 | Sih .............................. 379/410 |
| 5,737,410 A | | 4/1998 | Vähätalo et al. ............. 379/410 |
| 5,920,548 A | * | 7/1999 | El Malki ...................... 379/411 |

FOREIGN PATENT DOCUMENTS

| WO | WO 95/17784 | 6/1995 |
| WO | WO 97/23055 | 6/1997 |
| WO | WO 98/15067 | 4/1998 |

OTHER PUBLICATIONS

Van Trees, Harry L., Massachusetts Institute of Technology; *Detection, Estimation, and Modulation Theory, Part 1 Detection, Estimation, and Linear Modulation Theory*, pp. 18–47.

Basseville, M. et al.; *Detection of Abrupt Changes: Theory and Application, Change Detection Algorithms*, Prentice–Hall, Englewood Cliffs, NJ, Apr. 1993, pp. 25–65.

Eriksson, A., et al.; *Ericsson Echo Cancellers—a Key to Improved Speech Quality*, Ericsson Review No. 1, 1996, pp. 25–33.

*Part I Changes in the Scalar Parameter of an Independent Sequence*; XP–002129388, pp. 25–65.

Yip, P. et al.; *An Adaptive Multiple Echo Canceller for Slowly Time–Varying Echo Paths*. IEEE Transactions on Communications 38 (1990) Oct., No. 10, New York, US, XP000176867, pp. 1693–1698.

Sieben, S., European Search Report, App. No. SE 9901692, Feb. 1, 2000, pp. 1–4.

Bengtsson, R.; International–Type Search Report, App. No.99016925, Search Request No. SE 99/00579, Jan. 19, 2000, pp. 1–6.

\* cited by examiner

Primary Examiner—Rexford Barnie
(74) *Attorney, Agent, or Firm*—Jenkens & Gilchrist, P.C.

(57) ABSTRACT

A pure echo delay estimate of an echo path impulse response estimate represented by echo canceller filter coefficients is calculated. This is done by incrementing (S9) an assumed pure delay m, where m is a positive integer representing an offset of m filter coefficients into the echo path impulse response estimate, until (S8') a predetermined filter coefficient dependent decision function exceeds a predetermined threshold function, and by representing (S10) the pure delay by the smallest integer mSTART that makes the decision function exceed the threshold function.

17 Claims, 6 Drawing Sheets

PURE DELAY ESTIMATION

TECHNICAL FIELD

The present invention relates generally to pure delay estimation in telecommunication systems.

BACKGROUND

In telecommunication systems echo is generated at a hybrid circuit that transform a 4-wire connection into a 2-wire connection and vice versa. This echo is removed by an echo canceller that estimate the impulse response of the hybrid circuit and uses this estimate to model and cancel the echo. The impulse response estimate typically comprises a dispersive part, which corresponds to the actual echo generation, and a pure delay, which corresponds to the transmission delay from the echo canceller to the hybrid circuit and back to the echo canceller.

Many operators are interested in measurements of such a pure delay for obtaining source information for network planning. Delay measurements could be performed by applying test signals to the links of interest and measuring the response times for these signals. However, such a method would require extra equipment in the system and the measured lines would not be available for normal traffic during measurements.

Methods for determining pure delay estimates from an estimate of the echo path impulse response (estimated by echo canceller filter coefficients) are described in [1–5].

Reference [1] describes a two step method that first determines a filter tap that has exceeded a first, low threshold ("where things start to happen"). A second step starts at this position and determines a second filter tap that exceeds a second, higher threshold. The dispersive part of the impulse response is assumed to start a predetermined number of taps before this second tap and to last a predetermined number of taps from this start position. The method assumes that the first coefficients of the impulse response are zero. However, this assumption is not always true, which may lead to erroneous decisions. For example, the estimated impulse response may contain oscillations with rather long periods, due to filter coefficient estimation using telephone band speech signals in the presence of background noise from the near end side.

In the method described in [2] the dispersive part of the echo path is assumed to start a fixed number of taps before the filter coefficient with maximum value. This method is not especially accurate in any case and it just breaks down if there are multiple echoes.

Reference [3] describes a method for finding center of the echo path by computing cross-correlation function between the input (RIN) and echo (SIN) signals and determines the center of echo path dispersive part as the maximum of this cross-correlation function. The dispersive part is assumed to start half the filter length before its center, which is not an especially accurate method. Also, it should be noted that the delay estimation by cross-correlation is well justified only if the input signal (RIN) is white noise or if the echo path impulse response is just a single impulse. None of the above assumptions are normally true in network echo cancellation.

Reference [4] describes a method that determines regions of the filter impulse response where the energy is concentrated. This is done by summing the absolute values of filter taps within a window of length L and comparing each sum to a fixed threshold. The window slides over the impulse response, and the window positions that have a sum that exceeds the fixed threshold are considered to belong to echo containing regions. The remaining regions are considered to be delays. This method gives a rather coarse delay measurement.

Reference [5] is similar to reference [4] in that it describes a method that determines where in the filter impulse response the energy is concentrated. In this case the average energy of a window is compared to a fixed threshold.

Methods for detecting abrupt changes in signals are also described in [6]. However, these methods are based on step functions and are therefore not suitable for echo impulse response estimates.

SUMMARY

An object of the present invention is to provide an accurate method and system for performing pure delay measurements by using equipment already present in the telecommunication system and without blocking measured lines for normal traffic.

This object is solved by a method and a system in accordance with the appended claims.

Briefly, the present invention uses processing power already present in the system, such as network echo cancellers or control units, to estimate the pure delay of a just completed call. At the end of a call the filter coefficients of the echo canceller represent an estimate of the impulse response of the hybrid circuit, from which the pure delay may be determined. The present invention uses a method based on hypothesis testing to obtain the pure delay from this estimate. Thus, no extra equipment is required and the measured lines are free for normal traffic also during delay measurements.

BRIEF DESCRIPTION OF THE DRAWINGS

The invention, together with further objects and advantages thereof, may best be understood by making reference to the following description taken together with the accompanying drawings, in which.

DETAILED DESCRIPTION

The same reference designations will be used for the same or similar elements throughout the drawings.

Before the invention is described in detail, the background of the invention will be briefly described with reference to FIG. 1–2.

Figure 1:
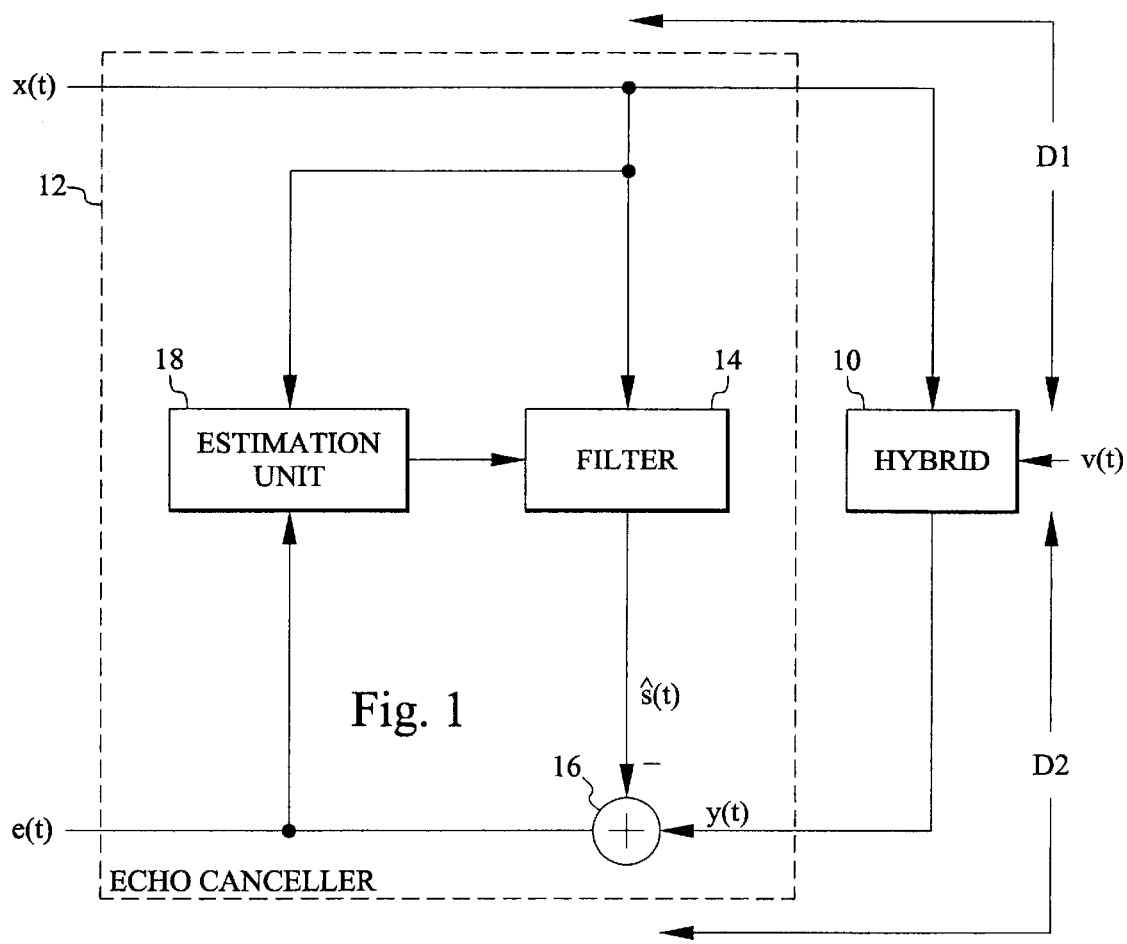
FIG. 1 is a block diagram illustrating echo generation and cancellation.

FIG. 1 is a block diagram illustrating echo generation and cancellation. An incoming far end signal x(t) on a 4-wire line reaches a hybrid 10, where it is transformed into an incoming signal on a 2-wire line in the local loop. An outgoing voice signal v(t) from the near end reaches hybrid 10 on the same 2-wire line in the local loop and is transformed into an outgoing signal y(t) by hybrid 10. However outgoing signal y(t) will also contain echo generated by hybrid 10 due to impedance mismatch. This echo is estimated and cancelled by an echo canceller 12. Echo canceller 12 includes a filter 14, which models (over its filter coefficients) the echo generation process and uses the far end signal to generate an estimate ŝ(t) of the echo signal. This estimate is subtracted from the outgoing signal y(t) in an adder 16 to produce a near end signal e(t). The filter coefficients are determined from the far end signal x(t) by an estimation unit 18, which controls filter 14. The echo canceller may also contain other elements, such as a non-linear processor and a double-talk detector. These elements are, however, not essential for describing the present invention and have therefore been omitted.

Figure 2:
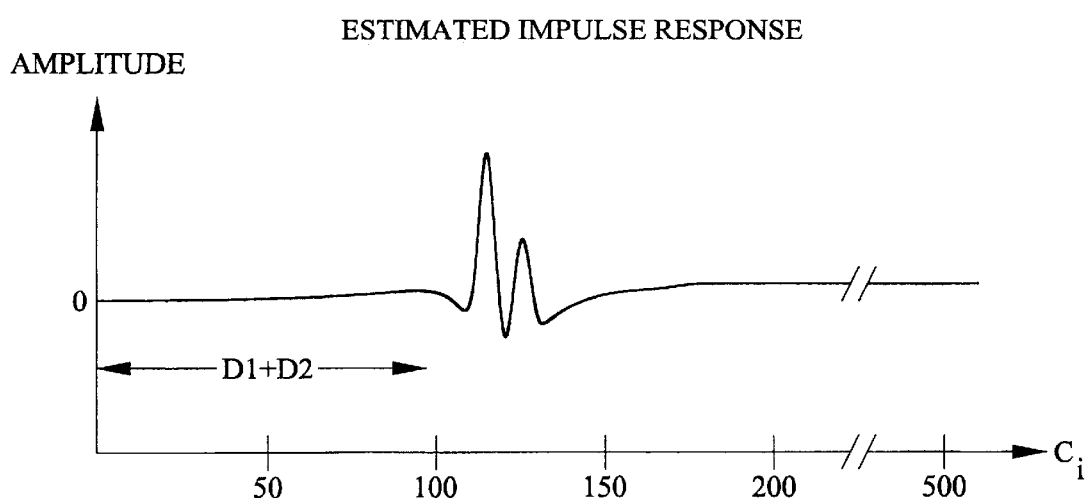
FIG. 2 is a diagram schematically illustrating an estimated impulse response of a hybrid circuit.

FIG. 2 is a diagram schematically illustrating an estimated impulse response of a hybrid circuit echo path. This estimated impulse response is represented by the filter coefficients $c_i$ of filter 14 in FIG. 1. The impulse response is characterized by a dispersive part, in which the coefficients have large amplitudes and which corresponds to the actual echo generation, preceded by a pure delay part D1+D2, in which the filter coefficients are small. The pure delay D1+D2 corresponds to the transmission time D1 from echo canceller 12 to hybrid 10 and the transmission time D2 from hybrid 10 back to echo canceller 12 (see FIG. 1).

Figure 3:
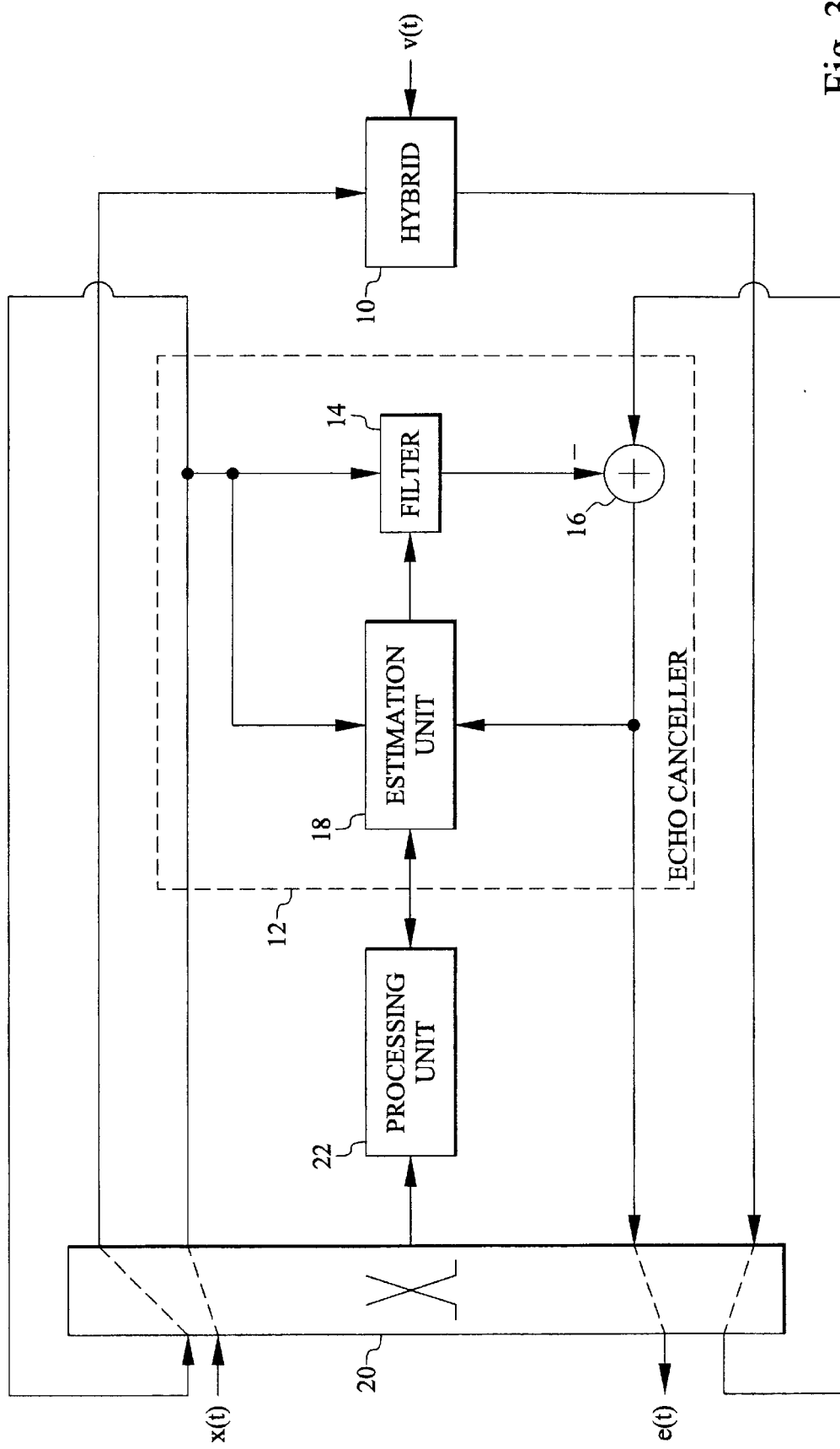
FIG. 3 is a block diagram of an embodiment of an echo cancellation system in accordance with the present invention.

FIG. 3 is a block diagram of an embodiment of an echo cancellation system in accordance with the present invention. Here elements 10–18 correspond to elements 10–18 in FIG. 1. Furthermore, echo canceller 12 is a network echo canceller. This means that it is a resource that is shared by the network. For this purpose echo canceller 12 is connected to a switch 20 and is controlled by a control or processing unit 22, which also controls the switch. Far end signal x(t) passes switch 20 before it reaches echo canceller 12. Thereafter it passes switch 20 again before it reaches hybrid 10. Similarly, the outgoing signal from hybrid 10 passes switch 20 before it reaches echo canceller 12, and passes switch 20 once again before it is forwarded to the far end. Thus, in this case the pure delay D1+D2 will include two passages through switch 20, one to hybrid 10 and one from hybrid 10.

In accordance with the present invention a pure delay estimate is determined from the values of filter coefficients $c_i$ determined by estimation unit 18. These values may, for example, be read by processing unit 22 at the completion of a call involving network echo canceller 12.

A method for determining the pure delay from the filter coefficients will be described in detail below. However, since this method is based on hypothesis testing, it will be necessary to first outline the theory on which this test procedure is based.

Let x denote a Gaussian variable with mean $E[x]=a$ and variance $E[(x-a)^2]=\delta^2$. The probability density function of x is given by $$p_x(x) = \frac{1}{\delta\sqrt{2\pi}}\exp\left(-\frac{(x-a)^2}{2\delta^2}\right)$$

In the following derivation we are interested in the corresponding probability density function for a variable $$y=x^2$$

In order to obtain the probability density function for y we will need the probability function $$F_x(x) = \int_{-\infty}^{x} p(u)du$$

Each value of y corresponds to two values of x, namely $$x=\pm\sqrt{y}$$

Thus, the probability function for y is given by $$F_y(y)=F_x(\sqrt{y})-F_x(-\sqrt{y})$$

The probability density function for y is obtained by differentiating this function with respect to y $$p_y(x) =$$

$$\frac{d}{dy}F_y(y) = \frac{d}{dy}[F_x(\sqrt{y}) - F_x(-\sqrt{y})] = \frac{1}{2\sqrt{y}}[p_x(\sqrt{y}) + p_x(-\sqrt{y})]$$

Using the explicit probability density function for x above, this gives $$p_y(y) = \frac{1}{2\delta\sqrt{2\pi y}}\exp\left(-\frac{(\sqrt{y}-a)^2}{2\delta^2}\right) + \frac{1}{2\delta\sqrt{2\pi y}}\exp\left(-\frac{(-\sqrt{y}+a)^2}{2\delta^2}\right) =$$

$$\frac{1}{2\delta\sqrt{2\pi y}}\exp\left(-\frac{y+a^2}{2\delta^2}\right)\left[\exp\left(\frac{a\sqrt{y}}{\delta^2}\right) + \exp\left(\frac{a\sqrt{y}}{\delta^2}\right)\right] =$$

$$\frac{1}{\delta\sqrt{2\pi y}}\exp\left(-\frac{y+a^2}{2\delta^2}\right)\cosh\left(\frac{a\sqrt{y}}{\delta^2}\right)$$

In the following description x will represent a filter coefficient $c_i$ and y will represent $c_i^2$.

Consider a block of L<N squared filter coefficients $$c2=\{c_1^2, c_2^2 \ldots c_L^2\}$$

where N is the total number of filter coefficients. It is now possible to consider two hypotheses, namely $H_0$: c2 consists of estimation errors only, i.e. the block corresponds to a pure delay part of the impulse response.

$H_1$: c2 consists of estimation errors and some non-zero mean, i.e. the block contains a dispersive part of the impulse response.

Since we have assumed the estimation errors to be independent of each other, the joint probability density of the elements of c2 for the two hypotheses may be written as $$\begin{cases} p(c2|H_0) = \prod_{i=1}^{L} \frac{1}{\delta|c_i|\sqrt{2\pi}}\exp\left(-\frac{c_i^2+0^2}{2\delta^2}\right)\cosh\left(\frac{0|c_i|}{\delta 2}\right) \\ \qquad = \prod_{i=1}^{L} \frac{1}{\delta|c_i|\sqrt{2\pi}}\exp\left(-\frac{c_i^2}{2\delta^2}\right) \\ p(c2|H_0) = \prod_{i=1}^{L} \frac{1}{\delta|c_i|\sqrt{2\pi}}\exp\left(-\frac{c_i^2+a^2}{2\delta^2}\right)\cosh\left(\frac{a|c_i|}{\delta 2}\right) \end{cases}$$

where $p(c2|H_0)$ denotes the probability density function of c2, given that hypothesis $H_0$ is valid, while $p(c2|H_1)$ denotes the probability density function of c2, given that hypothesis $H_1$ is valid.

It is now possible to write the Bayes test (see [7]) as $$\Lambda(L) = \prod_{i=1}^{L} \frac{\frac{1}{\delta|c_i|\sqrt{2\pi}} \exp\left(-\frac{c_i^2 + a^2}{2\delta^2}\right) \cosh\left(\frac{a|c_i|}{\delta^2}\right)}{\frac{1}{\delta|c_i|\sqrt{2\pi}} \exp\left(-\frac{c_i^2}{2\delta^2}\right)}$$

$$= \prod_{i=1}^{L} \exp\left(-\frac{a^2}{2\delta^2}\right) \cosh\left(\frac{a|c_i|}{\delta^2}\right) > \frac{P}{1-P}$$

where P denotes an a priori probability of $H_0$ being true. If this inequality is fulfilled, then the hypothesis $H_1$ is considered to be true.

As will be shown below, the inequality derived above may be used as a basis for determining the pure delay of an echo path. However, before this can be done the three parameters $\delta^2$, a and P have to be determined.

1. The estimation error variance $\delta^2$ may be determined using the method described in [8].

2. It seems reasonable to determine the mean a, i.e. the smallest impulse response value which is to be considered as being non-zero in the impulse response, as the smallest value that can generate some significant echo. In the case of network echo cancellation the speech signals are A- or $\mu$-law quantized. This means that the signal range is limited between −66 dBm0 and 3 dBm0. A normal speech signal level is around −17 dBm0. If an echo attenuation (ERL) of around 40 dB is assumed, an echo level around −57 dBm0 will remain. This leaves a margin of around 10 dB. Assuming a filter having a single tap, an echo attenuation of 40 dB leads to the equation $$20 \cdot \log_{10}(a) = -40$$

which gives a≈0.01. Typical values of a are in the range 0.008–0.012.

3. From measurements made in the Swedish PSTN it has been determined that the dispersive part of the echo path impulse response is likely to start near its maximum. Since P represents the probability that the block c2 belongs to the pure delay part of the impulse response, P should be close to zero near the dispersive part of the estimated impulse response and increase as the block is shifted into the pure delay part. One exemplary way of constructing such a function is as follows: Denote the a priori probability for the dispersive part of the impulse response being non-zero in a block of M consecutive coefficients starting at coefficient m, where m is an index in the interval [1, N−M] by $$Q(m) = 1 - P(m)$$

Then Q(m) should be 1 for the block beginning with the maximum coefficient of the impulse response estimate and approach 0 as the block is shifted away from this maximum towards the beginning of the impulse response estimate. This behavior may be obtained by a function having the form $$Q_1(m) = \left(\frac{m}{m_{MAX}}\right)^p, \quad 1 \leq m \leq m_{MAX}$$

where p is a positive constant and $m_{MAX}$ denotes the index of the coefficient of the impulse response having the largest absolute value. Simulations have shown that p=2 is a suitable value.

The empirical fact that the dispersive part of the impulse response often starts close to the maximum tap may be further emphasized by including the factor $$Q_2(m) = \frac{1}{2}\left(1 + \frac{\sum_{i=m}^{m+K} c_i^2}{\sum_{i=1}^{N} c_i^2}\right)$$

where K is a positive integer, typically in the range 8–14. The value K=11 has been found to be a good choice. The factor $Q_2(m)$ will lie near 0.5 if the K coefficients following coefficient m lie outside of the dispersive part of the estimated impulse response and near 1 if all significant coefficients follow after the m-th coefficient. Thus, an exemplary a priori probability P(m) may be written as $$P(m) = 1 - Q_1(m) Q_2(m)$$

With these parameters the Bayes test may be written as $$\Lambda(L) = \prod_{i=1}^{L} \exp\left(-\frac{a^2}{2\delta^2}\right) \cosh\left(\frac{a|c_i|}{\delta^2}\right) > \frac{P(m)}{1 - P(m)}$$

The complexity of this test can be reduced by selecting a small value for the window length L. An especially simple test is, obtained by selecting L=1. This gives the simplified test $$\Lambda(1) = \exp\left(-\frac{a^2}{2\delta^2}\right) \cosh\left(\frac{a|c_m|}{\delta^2}\right) > \frac{P(m)}{1 - P(m)}$$

Solving this expression for the m-th estimated impulse response coefficient $|c_m|$ gives $$|c_m| > \frac{\delta^2}{a} \text{acosh}\left(\frac{P(m)}{1 - P(m)} \exp\left(\frac{a^2}{2\delta^2}\right)\right)$$

For large values of $a^2/2\delta^2$ this formula is not practical, since numerical problems may result from computing the exponent of a large number. In these cases it is appropriate to use the following approximation $$|c_m| > \frac{\delta^2}{a} \text{acosh}\left(\frac{P(m)}{1 - P(m)} \exp\left(\frac{a^2}{2\delta^2}\right)\right) =$$

$$\frac{\delta^2}{a} \ln\left(\frac{P(m)}{1 - P(m)} \exp\left(\frac{a^2}{2\delta^2}\right) + \sqrt{\left(\frac{P(m)}{1 - P(m)} \exp\left(\frac{a^2}{2\delta^2}\right)\right)^2 - 1}\right) \approx$$

$$\frac{\delta^2}{a} \ln\left(\frac{2P(m)}{1 - P(m)} \exp\left(\frac{a^2}{2\delta^2}\right)\right) = \frac{\delta^2}{a} \ln\left(\frac{2P(m)}{1 - P(m)}\right) + \frac{a}{2}$$

where the identity $$a \cos h(z) = \ln(z + \sqrt{z^2 - 1})$$

has been used. Note that this requires that $$\frac{P(m)}{1-P(m)} \exp\left(\frac{a^2}{2\delta^2}\right) > 1$$

since the square root should give a real number.

The above testing procedure assumes that the impulse response has been estimated using signals that are rich enough (for instance in their frequency content) to excite all the modes of the actual echo path. This assumption is not always valid if the estimation is based on speech signals, as is usually the case in network echo cancellers. In several cases, especially if the background noise level from the near end side has been higher than the background noise level from the far end side during a call, the impulse response estimate will contain errors at frequencies that have been under-represented in the far end signal. Existence of this kind of error components makes the hypothesis testing less reliable, since the variance of this type of errors is not known. In order to reduce the influence of this type of errors on the impulse response estimate, the estimate should preferably first be filtered to remove components that are normally not present in telephone band speech signals. A 4-th order elliptic low-pass filter with a cut-off frequency of 340 Hz has proven to be suitable for this purpose.

Based on the above discussion, it is possible to form algorithms for determining the pure delay of an echo path. Such algorithms will now be described with reference to FIG. 4 and 5.

Figure 4:
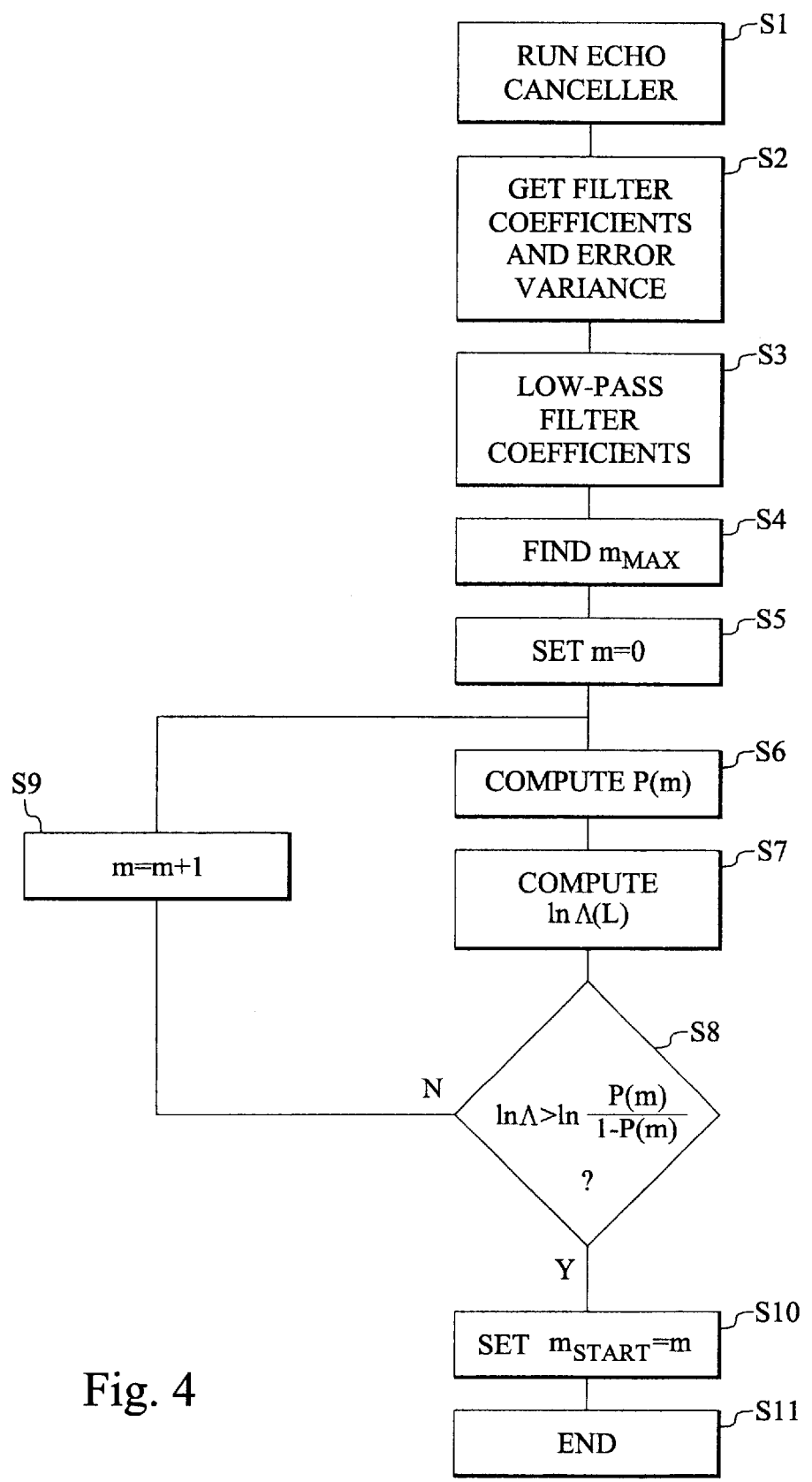
FIG. 4 is a flow chart illustrating an embodiment of a pure delay estimation method in accordance with the present invention.

FIG. 4 illustrates the general method based on the inequality $$\Lambda(L) = \prod_{i=1}^{L} \exp\left(-\frac{a^2}{2\delta^2}\right) \cosh\left(\frac{a|c_i|}{\delta^2}\right) > \frac{P(m)}{1-P(m)}$$

Taking the logarithm of both sides gives the equivalent inequality $$\ln\Lambda(L) = \sum_{i=1}^{L} \left[\ln\left(\cosh\left(\frac{a|c_i|}{\delta^2}\right) - \frac{a^2}{2\delta^2}\right)\right] > \ln\frac{P(m)}{1-P(m)}$$

The following steps may now be performed:
S1 Run the echo canceller during a call.
S2 Obtain the N estimated filter coefficients $\{c_i\}$ and the estimated error variance $\delta^2$ from the echo canceller.
S3 Low-pass filter the coefficients $\{c_i\}$ (in preferred embodiment).
S4 Find the index mMAX of the coefficient having the largest absolute value.
S5 Set m=0.
S6 Compute the a priori probability P(m).
S7 Compute the logarithm of $\Lambda(L)$ on the block of filter coefficients with indices i=m−L+1, . . . , m. The filter coefficients with negative indices are treated as zeros.
S8 If the inequality $$\ln\Lambda(L) > \ln\frac{P(m)}{1-P(m)}$$

is fulfilled, go to S10, otherwise go to S9.
S9 Increment m and go to step S6.
S10 Set mSTART=m. This defines the start of the dispersive part of the impulse response and therefore also the length of the pure delay.
S11 Ends the algorithm.

Figure 5:
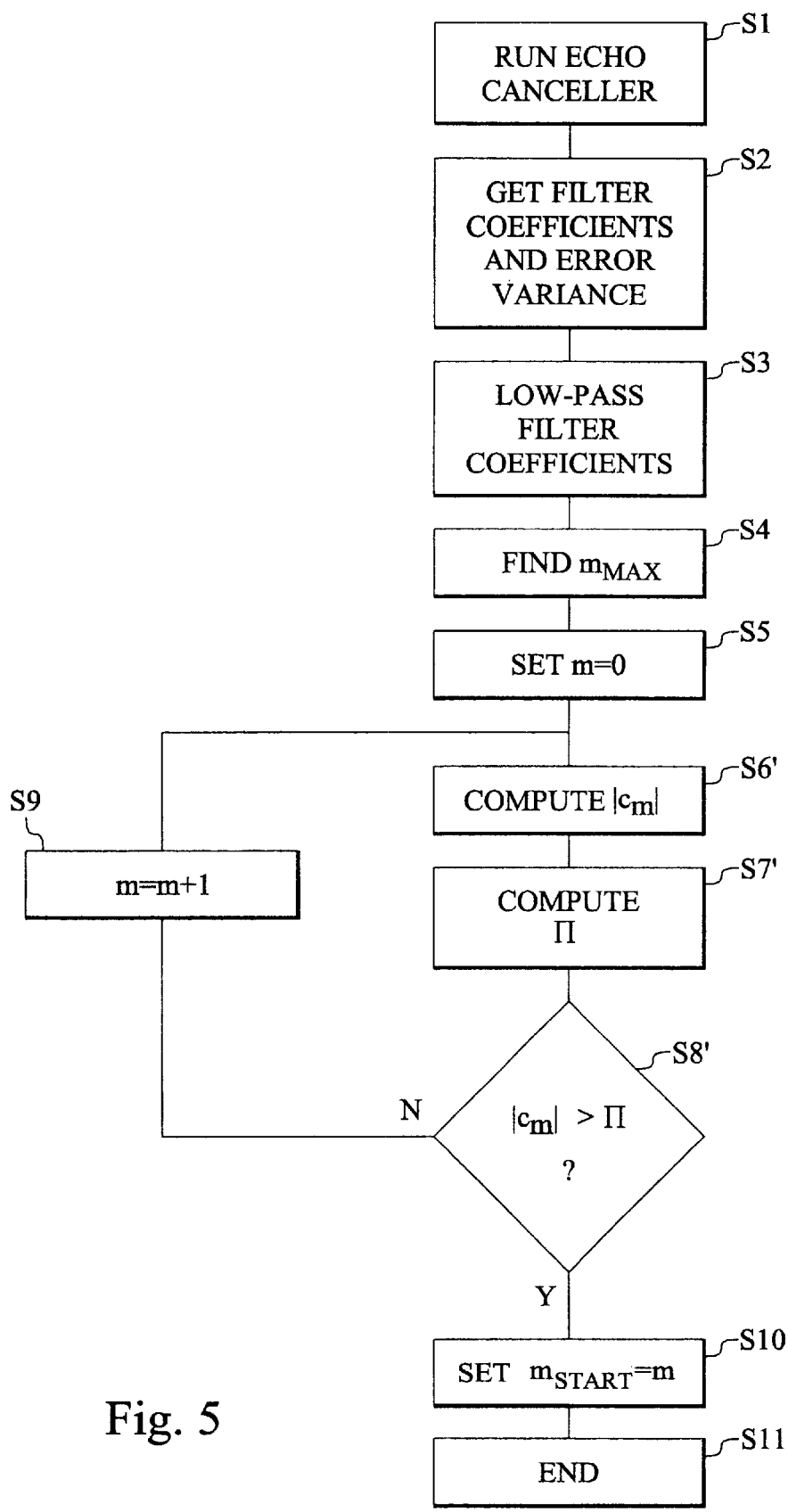
FIG. 5 is a flow chart illustrating another embodiment of a pure delay estimation method in accordance with the present invention.

FIG. 5 illustrates the method for L=1 and is based on the inequality $$|c_m| > \prod = \frac{\delta^2}{a}\ln\frac{2P(m)}{1-P(m)} + \frac{a}{2}$$

The following steps may now be performed:
S1 Run the echo canceller during a call.
S2 Obtain the N estimated filter coefficients $\{c_i\}$ and the estimated error variance $\delta^2$ from the echo canceller.
S3 Low-pass filter the coefficients $\{c_i\}$ (in preferred embodiment).
S4 Find the index mMAX of the coefficient having the largest absolute value.
S5 Set m=0.
S6' Compute $|c_m|$.
S7' Compute Π.
S8' If the inequality $$|c_m| > \Pi$$

is fulfilled, go to S10, otherwise go to S9.
S9 Increment m and go to step S6'.
S10 Set mSTART=m. This defines the start of the dispersive part of the impulse response and therefore also the length of the pure delay.
S11 Ends the algorithm.

In these algorithms it has been assumed that the processing is performed in processing unit 22. However, this is not a requirement. For example, the processing may also be performed in estimation unit 18.

The above described algorithms may be used to obtain delay information associated with calls to and from remote networks, for example networks operated by other operators, or from sub-networks within the same network, for example calls to and from a certain area code. When a future call is set-up to or from such a remote network or sub-network, an initial delay estimate may be transferred to the echo canceller, thereby reducing the number of filter coefficients that have to be determined. This has several advantages:

1. It reduces the computational load on the echo canceller, which means that simpler or more cost efficient echo cancellers may be used.

2. It leads to a higher convergence rate, i.e. the initial echo containing period of a new call (before the echo canceller has converged) is shortened.

3. The residual echo will be lower (better cancellation).

Figure 6:
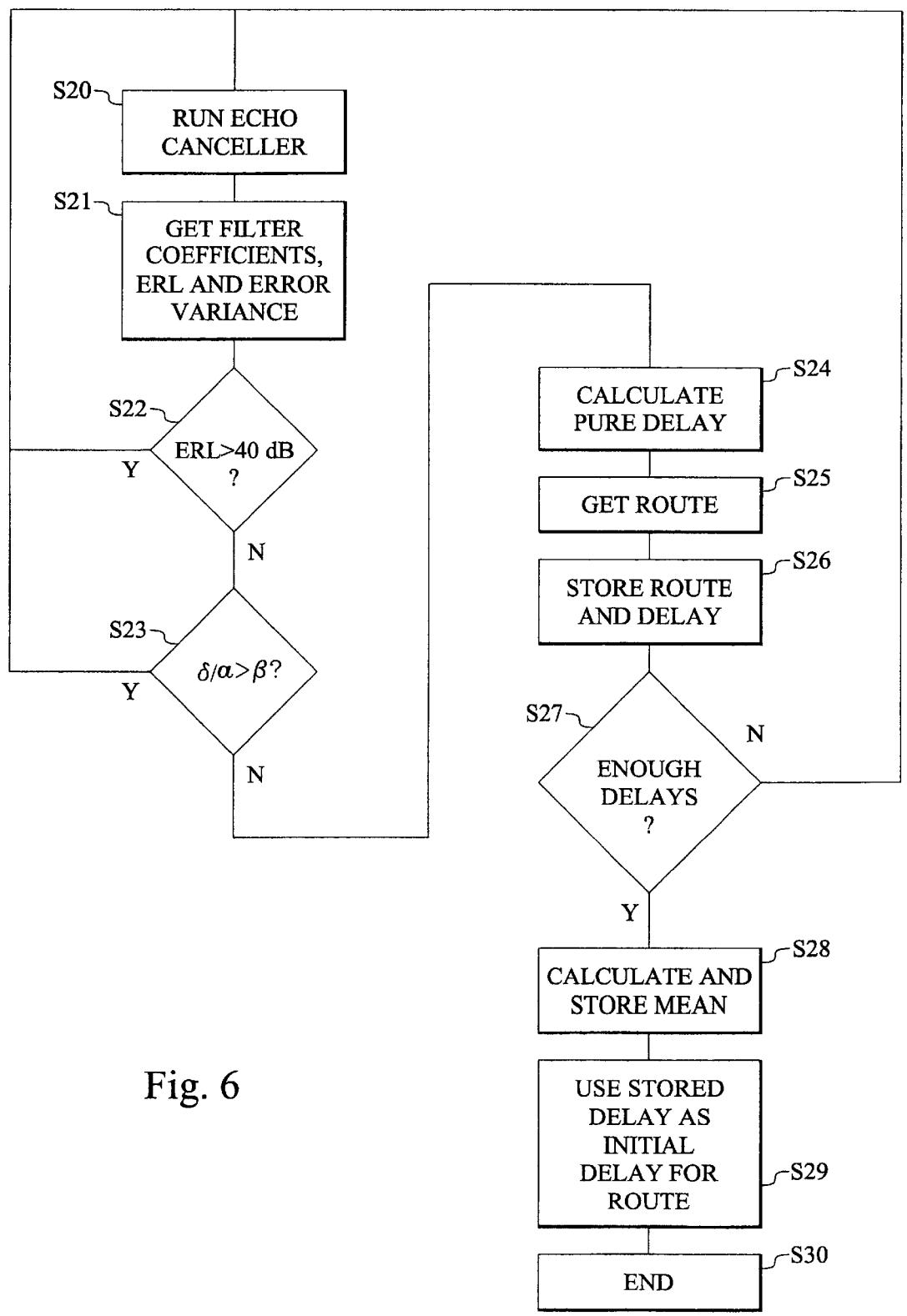
FIG. 6 is a flow chart illustrating an embodiment of a method for determining and setting initial pure delays in echo cancellers.

An embodiment of this procedure is illustrated in FIG. 6 and may be summarized as follows:
S20 Run the echo canceller during a call to or from a specific remote or sub-network (The same algorithm is used for each remote or sub-network.).
S21 Obtain the N estimated filter coefficients $\{c_i\}$, the estimated error variance $\delta^2$ and the echo return loss ERL from echo canceller 12 after call completion.
S22 If ERL exceeds a threshold, for example 40 dB, this indicates that there is no echo source (e.g. an ISDN line) or that the echo canceller has not converged, for example due to an absent signal. In this case the algorithm proceeds to step S20 to process the next call, since it is preferable to inhibit further processing instead of obtaining a non-reliable delay. Otherwise step S23 is performed.
S23 If $\delta/a > \beta$, indicating that the coefficient estimation error is large, it is also preferable to inhibit further processing, since the probability of faulty decisions is large. The algorithm proceeds to step S27 to process the next call if the inequality is fulfilled. Otherwise the algorithm proceeds to step S24. Typically β has a value in the range 0.3 to 0.6. A suitable value is β=0.44.

S24 Calculate a pure delay, for example in accordance with one of the above described algorithms.

S25 Obtain route information identifying the remote or sub network from exchange 20.

S26 Store route and delay information.

S27 If enough delays for this route (remote or sub-network) have been collected, the algorithm proceeds to step 28, otherwise it proceeds to step S20 to process the next call.

S28 Calculate and store an average pure delay (truncated or rounded to nearest integer) for the route.

S29 Use stored pure delay as initial delay in future calls to or from that remote or sub-network. This may be done by "virtual trunks", which is a method of assigning route specific parameters to an echo canceller. It will set up the echo canceller to fit the route to which it will be connected. See [9] for more information on virtual trunks.

S30 Ends algorithm.

An alternative is to continuously update the average delay by including newer calls and excluding older calls in the average value calculation.

The average value calculation may be performed directly in accordance with $$\overline{D} = \frac{1}{N_c} \sum_{i=1}^{N_c} n_i D_i$$

where $N_c$ is the total number of calls for the route and $n_i$ is the number of calls having estimated delay $D_i$. Another alternative is to use histograms, where estimated delays are sorted into intervals and the number of calls in each interval are counted. This leads to $$\overline{D} = \frac{\sum_i m_i h_i}{\sum_i m_i}$$

where $m_i$ denotes the number of calls belonging to a delay interval having a center value $h_i$.

Figure 7:
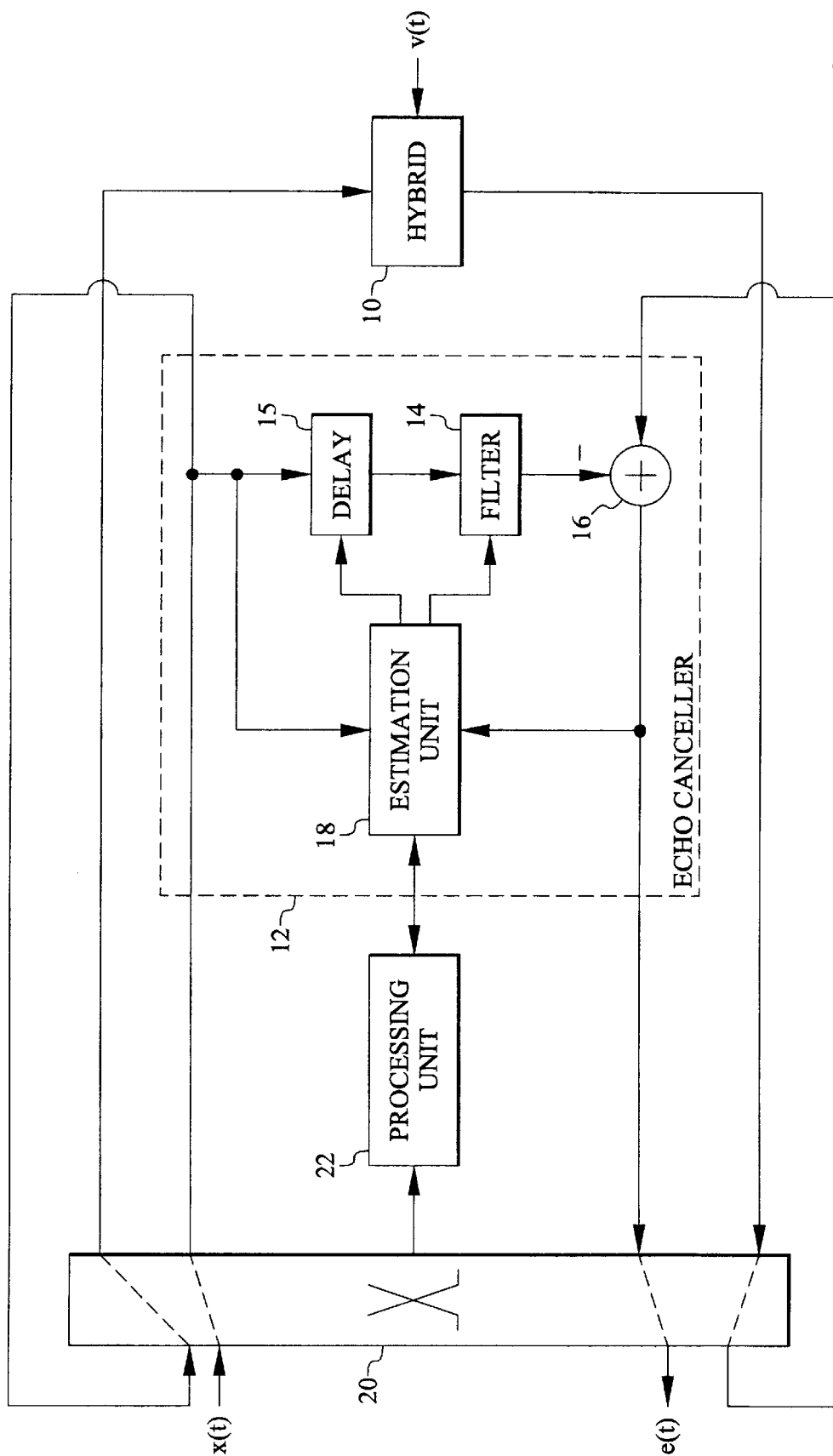
FIG. 7 is a block diagram of another embodiment of an echo cancellation system in accordance with the present invention.

FIG. 7 is a block diagram of another echo cancellation system in accordance with the present invention. The echo cancellers typically have a finite impulse response (FIR) filter, which models the impulse response of the echo path (typically 512 taps=64 ms at 8000 Hz sampling rate). The echo canceller is able to cancel the echo only if the actual echo path lies inside the delay interval covered by the FIR filter. If part of the actual echo path is not covered by the FIR filter the echo canceller performance is poor. Many echo cancellers therefore have the possibility to set a so called pure delay element 15 before the FIR filter to shift the position of the echo path model for the routes involving longer delays. This element may be considered as an extension of filter 14 in which all taps are zero. A typical situation where such a delay element may be necessary is when a call is going to a remote area, so that the hybrid 10 is located far away from the switch 20 (and from the echo canceller 12) giving rise to some propagation delay. On its way to the remote location, the call may pass several switches located between the echo canceller and the hybrid all adding their delays. In addition there may be signal compression equipment installed on the trunks between the switches adding a considerable signal processing delay to the echo path. These delays when adding up may exceed the time window covered by the echo canceller filter (typically 64 ms). As a result the dispersive part of the echo path impulse response may lie partly or even fully outside the reach of the echo canceller or in other words the echo canceller is no longer able to "see" the echo.

In the embodiment o FIG. 7 the delay of delay element 15, which has been determined by estimation unit 18 during a call, is also transferred to processing unit 22. There it is converted into a corresponding number of zero coefficients that precede the actual filter coefficients. Thereafter the same algorithms as in FIG. 4–6 may be used to determine and store a pure delay.

When an echo canceller is initialized, delay element 15 is initialized to the pure delay or a certain percentage thereof (typically 80–90%). This ensures that filter 14 will "see" the impulse response.

In addition to the algorithms described with reference to FIG. 4–5, other algorithms for determining a pure delay, such as the algorithms described in [1–3], may also be used in the algorithm described with reference to FIG. 6–7. However, it should be kept in mind that these methods are less reliable than the methods described with reference to FIG. 4–5.

It will be understood by those skilled in the art that various modifications and changes may be made to the present invention without departure from the scope thereof, which is defined by the appended claims.

REFERENCES

[1] WO 98/15067, Telefonaktiebolaget L M Ericsson
[2] U.S. Pat. No. 4,736,414, Montagna et. al.
[3] U.S. Pat. No. 5,737,410, Vähätalo et. al.
[4] Philip Chu-Wan Yip et al, An Adaptive Multiple Echo Canceller for Slowly Time-varying Echo Paths" IEEE Transactions on Communications, Vol 38, No. 10, pp1693–1698.
[5] U.S. Pat. No. 4,823,382, Martinez
[6] M. Basseville and L. V. Nikiforov, "Detection of Abrupt Changes: Theory and Application", Prentice Hall, pp. 25–65. PDF-file available at http://www.irisa.fr/sigma2/kniga
[7] H. L. van Trees, "Detection, Estimation and Modulation Theory", John Wiley & Sons, 1967, pp. 1–46.
[8] WO 97/23055, Telefonaktiebolaget L M Ericsson
[9] A. Eriksson, G. Eriksson, J. Karlsen, "Ericsson echo cancellers—a key to improved speech quality", Ericsson Review No. 1, 1996, pp.25–33.

What is claimed is:

1. A method of calculating a pure echo delay estimate of an echo path impulse response estimate represented by echo canceller filter coefficients, said method including incrementing an assumed pure delay m, where m is a positive integer representing an offset of m filter coefficients into said echo path impulse response estimate, until a predetermined filter coefficient dependent decision function exceeds a predetermined threshold function of an a priori probability P(m) that the first m filter coefficients represent only pure delay; and representing said pure delay by the smallest integer $m_{START}$ that makes said decision function exceed said threshold function.

2. The method of claim 1, wherein said decision function is represented by $$\sum_{i=1}^{L}\left[\ln\left(\cosh\left(\frac{a|c_i|}{\delta^2}\right)-\frac{a^2}{2\delta^2}\right)\right]$$

where
L is a positive integer,
a is a constant,
$c_i$ are filter coefficients, and
$\delta^2$ is an estimated filter coefficient error variance.

3. The method of claim 2, wherein said threshold function is represented by $$\ln\frac{P(m)}{1-P(m)}$$

where P(m) is said a priori probability that the first m filter coefficients represent only pure delay.

4. The method of claim 1, wherein said decision function is represented by $|c_m|$, where $c_m$ is the m-th filter coefficient.

5. The method of claim 4, wherein said threshold function is represented by $$\frac{\delta^2}{a}\ln\frac{2P(m)}{1-P(m)}+\frac{a}{2}$$

where
P(m) is said a priori probability that the first m filter coefficients represent only pure delay,
a is a constant, and
$\delta^2$ is an estimated filter coefficient error variance.

6. The method of claim 3 or 5, wherein said a priori probability P(m) is defined as $$P(m)=1-Q_1(m)Q_2(m)$$

where $Q_1(m)$ and $Q_2(m)$ are defined by $$Q_1(m)=\left(\frac{m}{m_{MAX}}\right)^p, 1\leq m\leq m_{MAX} \text{ and}$$

$$Q_2(m)=\frac{1}{2}\left(1+\frac{\sum_{i=m}^{m+K}c_i^2}{\sum_{i=1}^{N}c_i^2}\right)$$

where
$m_{MAX}$ is the index of the filter coefficient with the largest absolute value, p is a positive constant, and
K is a positive integer.

7. The method of any of the preceding claims 1–5, further including low-pass filtering said echo canceller filter coefficients before calculating said pure echo delay estimate.

8. A method of calculating a pure echo delay estimate, said method including
estimating pure echo delays of a predetermined number of completed calls associated with a common route;
determining an average delay from said estimated pure delays; and
wherein each pure echo delay is estimated from an echo path impulse response estimate represented by echo canceller filter coefficients by performing the steps:
incrementing an assumed pure delay m, where m is a positive integer representing an offset of m filter coefficients into said echo path impulse response estimate, until a predetermined filter coefficient dependent decision function exceeds a predetermined threshold function of an a priori probability P(m) that the first m filter coefficients represent only pure delay; and
representing said pure delay by the smallest integer $m_{START}$ that makes said decision function exceed said threshold function.

9. The method of claim 8, wherein said decision function is represented by $$\sum_{i=1}^{L}\left[\ln\left(\cosh\left(\frac{a|c_i|}{\delta^2}\right)-\frac{a^2}{2\delta^2}\right)\right]$$

where
L is a positive integer,
a is a constant,
$c_i$ are filter coefficients, and
$\delta^2$ is an estimated filter coefficient error variance.

10. The method of claim 9, wherein said threshold function is represented by $$\ln\frac{P(m)}{1-P(m)}$$

where P(m) is said a priori probability that the first m filter coefficients represent only pure delay.

11. The method of claim 8, wherein said decision function is represented by $|c_m|$, where $c_m$ is the m-th filter coefficient.

12. The method of claim 11, wherein said threshold function is represented by $$\frac{\delta^2}{a}\ln\frac{2P(m)}{1-P(m)}+\frac{a}{2}$$

where
P(m) is said a priori probability that the first m filter coefficients represent only pure delay,
a is a constant, and
$\delta^2$ is an estimated filter coefficient error variance.

13. The method of claim 10 or 12, wherein said a priori probability P(m) is defined as $$P(m)=1-Q_1(m)Q_2(m)$$

where $Q_1(m)$ and $Q_2(m)$ are defined by $$Q_1(m)=\left(\frac{m}{m_{MAX}}\right)^p, 1\leq m\leq m_{MAX} \text{ and}$$

$$Q_2(m)=\frac{1}{2}\left(1+\frac{\sum_{i=m}^{m+K}c_i^2}{\sum_{i=1}^{N}c_i^2}\right)$$

where
$m_{MAX}$ is the index of the filter coefficient with the largest absolute value, p is a positive constant, and K is a positive integer.

14. The method of any of claims 8 or 9, including low-pass filtering said echo canceller filter coefficients before calculating said pure echo delay estimate.

15. The method of any of claims 8 or 9, including inhibiting pure delay estimation for a call if the echo attenuation for the call exceeds a first predetermined value.

16. The method of any of claims 9, 10, or 12, including inhibiting pure delay estimation for a call if a/δ for the call exceeds a second predetermined value.

17. The method of any of claims 8 or 9, including initializing an echo canceller delay to said average delay at set up of a new call using said common route.

* * * * *

UNITED STATES PATENT AND TRADEMARK OFFICE
CERTIFICATE OF CORRECTION

PATENT NO. : 6,687,372 B1
DATED : February 3, 2004
INVENTOR(S) : Tonu Trump et al.

It is certified that error appears in the above-identified patent and that said Letters Patent is hereby corrected as shown below:

Column 4,
Line 31, replace " $\exp\left[\frac{a\sqrt{y}}{\delta^2}\right)\right]$ " with -- $\exp\left(-\frac{a\sqrt{y}}{\delta^2}\right)\right]$ --

Line 60, replace "$p(c2/H_o)$" with -- $p(c2/H_1)$ --

Column 5,
Line 5, replace " $\cos\ h\left(\frac{a/c_i l}{\delta 2}\right)$ " with -- $\cos\ h\left(\frac{a/c_i l}{\delta^2}\right)$ --

Line 9, replace " $\cos\ h\left(\frac{a/c_i l}{\delta 2}\right)$ " with -- $\cos\ h\left(\frac{a/c_i l}{\delta^2}\right)$ --

Column 6,
Line 67, replace "1n," with -- In --

Column 8,
Line 18, replace "Compute III." with -- Compute $\pi$. --

Column 10,
Line 47, replace "pp. 1-46." with -- pp. 19-46. --

Signed and Sealed this

Fourteenth Day of September, 2004

JON W. DUDAS
*Director of the United States Patent and Trademark Office*